United States Patent
Zhang

(10) Patent No.: US 8,711,313 B2
(45) Date of Patent: Apr. 29, 2014

(54) STRUCTURE OF PIXEL ELECTRODE

(75) Inventor: Xin Zhang, Shenzhen (CN)

(73) Assignees: Shenzhen China Star Optoelectronics Technology Co., Ltd., Shenzhen, Guangdong Province (CN); Shanghai Tianma Micro-Electronics Co., Ltd., Shanghai (CN)

( * ) Notice: Subject to any disclaimer, the term of this patent is extended or adjusted under 35 U.S.C. 154(b) by 75 days.

(21) Appl. No.: 13/381,891

(22) PCT Filed: Aug. 30, 2011

(86) PCT No.: PCT/CN2011/079097
§ 371 (c)(1),
(2), (4) Date: Dec. 30, 2011

(87) PCT Pub. No.: WO2012/129890
PCT Pub. Date: Oct. 4, 2012

(65) Prior Publication Data
US 2012/0314173 A1   Dec. 13, 2012

(51) Int. Cl.
*G02F 1/1343* (2006.01)
*G02F 1/1337* (2006.01)

(52) U.S. Cl.
USPC .......................... 349/141; 349/130; 349/143

(58) Field of Classification Search
USPC .................... 349/129, 130, 139, 141, 142
See application file for complete search history.

(56) References Cited

U.S. PATENT DOCUMENTS

| | | | | |
|---|---|---|---|---|
| 8,189,153 | B2 * | 5/2012 | Ting et al. | 349/129 |
| 2008/0011895 | A1 | 1/2008 | Bleshoy | |
| 2009/0180065 | A1 * | 7/2009 | Chan et al. | 349/139 |
| 2011/0242468 | A1 * | 10/2011 | Choi et al. | 349/129 |

FOREIGN PATENT DOCUMENTS

| | | |
|---|---|---|
| CN | 2847844 Y | 12/2006 |
| CN | 102134022 A | 7/2011 |
| CN | 201971505 U | 9/2011 |
| DE | 20313853 U1 | 12/2003 |

* cited by examiner

*Primary Examiner* — Bumsuk Won
*Assistant Examiner* — Ryan Crockett
(74) *Attorney, Agent, or Firm* — Cheng-Ju Chiang

(57) ABSTRACT

A structure of pixel electrode includes a strip-like horizontal main trunk and a strip-like vertical main trunk, the horizontal main trunk and the vertical main trunk centrally and perpendicularly intersecting each other; a plurality of strip-like branches arranged in each of four domains that are formed by being equally divided by the central perpendicular intersection of the horizontal main trunk and the vertical main trunk, the plurality of strip-like branches extending outward from a central point of the perpendicular intersection of the vertical main trunk and the horizontal main trunk, the plurality of strip-like branches being spaced by a plurality of slits; and two centrally symmetric polygonal or sector openings provided in a central zone at the central perpendicular intersection of the horizontal main trunk and the vertical main trunk.

13 Claims, 6 Drawing Sheets

STRUCTURE OF PIXEL ELECTRODE

CROSS REFERENCES TO RELATED APPLICATIONS

This application claims the priority of Chinese Patent Application No. 201110150608.9, of which the title is "Structure of Pixel Electrode", filed with Chinese Patent Office on Jun. 7, 2011, which, in its entirety is hereby incorporated for reference. The present application is also a 35 U.S.C. §371 National Phase conversion of International (PCT) Patent Application Ser. No. PCT/CN2011/079097, filed on Aug. 30, 2011, the disclosure of which is incorporated by reference herein. The PCT International Patent Application was filed in Chinese.

BACKGROUND OF THE INVENTION

1. Field of the Invention

The present invention relates to the field of liquid crystal displaying techniques, and in particular to a pixel electrode structure of liquid crystal display device.

2. The Related Arts

Liquid crystal displays (LCDs) are one of the most commonly used flat panel displays. An LCD comprises a pair of substrates that are provided with field generating electrodes, such as pixel electrode and common electrode, and a liquid crystal (LC) layer interposed between the two substrates. When a voltage is applied to the field generating electrode to induce an electric field in the LC layer, the electric field determines the orientation of the LC molecules of the liquid crystal layer so as to adjust the polarization of the light incident to the liquid crystal layer to allow an image to be displayed by the LCD.

A so-called polymer stabilized vertical alignment (PSVA) technique has been developed in the industry and such a technique mixes monomer of a suitable concentration in a liquid crystal material and uniformly shakes. Afterwards, the mixed liquid crystal material is positioned in a heater to be heated until reaching a condition of isotropy. When the liquid crystal mixture is cooled down to the room temperature, the liquid crystal mixture returns to a nematic condition. Afterwards, the liquid crystal mixture is filled into a liquid crystal box and is subject to application of voltage. When the applied voltage makes the arrangement of liquid crystal molecules stable, the monomer is caused to perform polymerization by means of ultraviolet radiation or heating in order to form a polymer layer, so as to achieve the purpose of alignment stabilization.

FIG. 1 is a schematic view showing a conventional design of pixel electrode that is commonly used in regular VA (Vertical Alignment) mode liquid crystal display (LCD) devices.

As shown in FIG. 1, the regular VA mode LCD has pixel electrodes that are of snow flake like configuration, comprising a strip-like vertical main trunk, a strip-like horizontal main trunk, and strip-like branches that are set at predetermined angle with respect to the horizontal main trunk. Typically, the angles between the strip-like branches and the horizontal main trunk are ±45 degrees and ±135 degrees. Each of the strip-like branches is located on the same plane as the vertical main trunk and the horizontal main trunk. The vertical main trunk and the horizontal main trunk centrally and perpendicularly intersect each other. The term "central perpendicular intersection" as used herein refers to the vertical main trunk and the horizontal main trunk being perpendicular to each other and an area around a center of the perpendicular intersection being a central zone of a unit pixel electrode, the vertical main trunk and the horizontal main trunk equally dividing the whole pixel area into four domains, each domain being formed of flat-laying strip-like branches that show predetermined angles with respect to the vertical main trunk or the horizontal main trunk. In this way, an arrangement of snow flake like electrode that is of mirror symmetry in up-down direction and left-right direction is formed as shown in FIG. 1.

FIG. 2 is a schematic view illustrating inclination of liquid crystal with a voltage (around 0 to 4V, arrow indicating the application of voltage) applied to the structure of pixel electrode shown in FIG. 1.

As shown in FIG. 2, when a snow flake like electrode structure that is regularly adopted is energized, the orientation of liquid crystal is gradually inclined from outside of the pixel electrode toward inside of the pixel electrode and the angle of inclination is along the direction of the branches. In the four domains, the liquid crystal of the right upper domain is inclined in a direction of 45 degrees; the liquid crystal of the left upper domain is inclined in a direction of 135 degrees; the liquid crystal of the left lower domain is inclined in a direction of 225 degrees; and the liquid crystal of the right lower domain is inclined in a direction of 315 degrees. The inclination directions of the liquid crystals in all the domains point toward the central zone of the pixel electrode.

To increase transmittance of a panel, the structure of pixel electrode of the known technique makes the central zone symmetric. However, for a unit pixel electrode, since all liquid crystals are inclined at directions pointing toward the central zone of the pixel electrode, a swirl like liquid crystal rotation region is definitely formed in the main trunks, of which a specific simulation is shown in FIG. 3. FIG. 3 is a schematic view illustrating inclination of liquid crystal in a structure of pixel electrode causes formation of a swirl at the center. FIG. 4 is a schematic view of the structure of pixel electrode corresponding to FIG. 3 observed with a microscope, in which reference character F indicates the location where the swirl like liquid crystal rotation region caused by inclination of liquid crystal.

However, since the chance that the swirl like rotation region caused by inclination of liquid crystal occurs on a central zone of the main trunks or on an edge portion of the main trunks is substantially the same and thus, the swirl like rotation region may sometime occur on an edge portion of the main trunks of which a specific simulation is illustrated in FIG. 5. FIG. 5 is a schematic view illustrating a swirl caused by inclination of liquid crystal in a structure of pixel electrode is sideway shifted. Due to such a situation, once a pixel electrode is energized to drive reorientation of liquid crystal, if a swirl like liquid crystal rotation region F occurs on an edge portion of the main trunks, then non-uniformly displayed disclination lines may occur around the swirl like liquid crystal rotation region F, as specifically shown in the schematic view of observation with a microscope. FIG. 6 is a schematic view of the structure of pixel electrode corresponding to FIG. 5 observed with a microscope. In FIG. 6, the serration shown around the swirl like liquid crystal rotation region F is disclination. In the known technique illustrated in FIG. 6, the "disclination" phenomenon caused by the swirl liquid crystal rotation region occurs at edges of displaying sites of upper and lower displaying domains at one side portion of the unit pixel electrode and this makes a displaying area become a light-blocked area, leading to reduction of transmittance and poor quality of image displaying.

SUMMARY OF THE INVENTION

The present invention provides a structure of pixel electrode, which effectively overcomes the technical problem that the absolute symmetry arrangement of the conventional structure of pixel electrode causes the location of a swirl formed by liquid crystal shifting away from a center, which leads to reduced bright area in a displaying zone and reduced transmittance.

To solve the above technical problem, the present invention provides a structure of pixel electrode, which comprises:

a strip-like horizontal main trunk and a strip-like vertical main trunk, the horizontal main trunk and the vertical main trunk centrally and perpendicularly intersecting each other;

a plurality of strip-like branches arranged in each of four domains that are formed by being equally divided by the central perpendicular intersection of the horizontal main trunk and the vertical main trunk, the plurality of strip-like branches extending outward from a central point of the perpendicular intersection of the vertical main trunk and the horizontal main trunk, the plurality of strip-like branches being spaced by a plurality of slits;

two centrally symmetric openings provided in a central zone at the central perpendicular intersection of the horizontal main trunk and the vertical main trunk.

Preferably, the two centrally symmetric openings have a shape of polygon or sector.

Preferably, the central zone at the perpendicular intersection of the horizontal main trunk and the vertical main trunk has a length of $x \leq X/2$ in horizontal direction, where X indicates length of the horizontal main trunk, and the central zone at the perpendicular intersection of the horizontal main trunk and the vertical main trunk has a length of $y \leq Y/2$ in vertical direction, where Y indicates length of the vertical main trunk.

Preferably, among the four domains formed by being equally divided by the central perpendicular intersection of the horizontal main trunk and the vertical main trunk, a left upper domain and a right upper domain are of mirror symmetry; a left lower domain and a right lower domain are of mirror symmetry; the left upper domain and the left lower domain are of mirror symmetry; and the right upper domain and the right lower domain are of mirror symmetry.

Preferably, the structure of pixel electrode has a snow flake like configuration, the plurality of strip-like branches being at an included angle of 45 degrees with respect to the vertical main trunk and the horizontal main trunk.

Preferably, the plurality of strip-like branches is spaced by a plurality of slits of identical width.

Preferably, the plurality of strip-like branches is spaced by a plurality of slits of different widths.

Preferably, the plurality of strip-like branches has identical width.

Preferably, the plurality of strip-like branches has different widths.

Preferably, modes of liquid crystal display panel to which the structure of pixel electrode is applicable include polymer stabilization vertical alignment mode and pattern vertical alignment.

Practicing the embodiment of the present invention provides the following advantages:

The structure of pixel electrode of this application is of an elaborate design and specifically, two centrally symmetric openings are provided in a central zone at a central perpendicular intersection of a vertical main trunk and a horizontal main trunk in order to make a breakthrough in respect of the absolute symmetry arrangement of the existing designs of pixel electrode structure and to allow the overall structure of pixel electrode to show central symmetry but is not left-right symmetric. This is helpful in guiding liquid crystal to form a swirl like liquid crystal rotation region in the site within the central zone of the structure of pixel electrode where the openings are formed. Since the openings are centrally symmetric, they can well maintain the location of the swirl like liquid crystal rotation region, namely fixing the swirl like liquid crystal rotation region at a central location, so as to prevent reduction of bright area and transmittance of a displaying zone when an image is displayed. Through application of the structure of pixel electrode according to the present invention, a liquid crystal display panel may have an increased bright area, an improved transmittance, and improved displaying performance.

BRIEF DESCRIPTION OF THE DRAWINGS

To more clearly describe the technical solution of the embodiments according to the present invention or the prior techniques, a brief description of the drawings that are necessary for the illustration of the embodiments or the prior art will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

In view of the drawback of the conventional structure of pixel electrode and liquid crystal display array substrate that have low transmittance and poor displaying performance, the present invention provides a novel structure of pixel electrode in order to effectively overcome the drawback.

First of all, it is noted here that the present invention is made to improve the conventional structure of pixel electrode having a snow flake like configuration. The essence of the invention is to make a breakthrough in respect of the absolute symmetry arrangement of the existing structure of pixel electrode by providing two openings in a central zone at the intersection of a vertical main trunk and a horizontal main trunk of the pixel electrode structure; and the openings are of central symmetry. The term "central symmetry" as used herein refers to a polygon or a sector, after rotating about a center by 180 degrees, completely overlaps another polygon or sector. In this way, due to two openings being provided at the central zone of a central perpendicular intersection between the vertical main trunk and the horizontal main trunk, a guide is given to orient liquid crystal, namely shifting at the sites of the two centrally symmetric openings. Due to the two openings being centrally symmetric, liquid crystal forms a swirl like liquid crystal rotation region at this location so that the location of the swirl like liquid crystal rotation region is set fixed in the central zone and is kept from moving elsewhere to cause reduction of transmittance of the pixel electrode structure.

An embodiment of the present invention will be described in detail with reference to the drawings.

Figure 7:
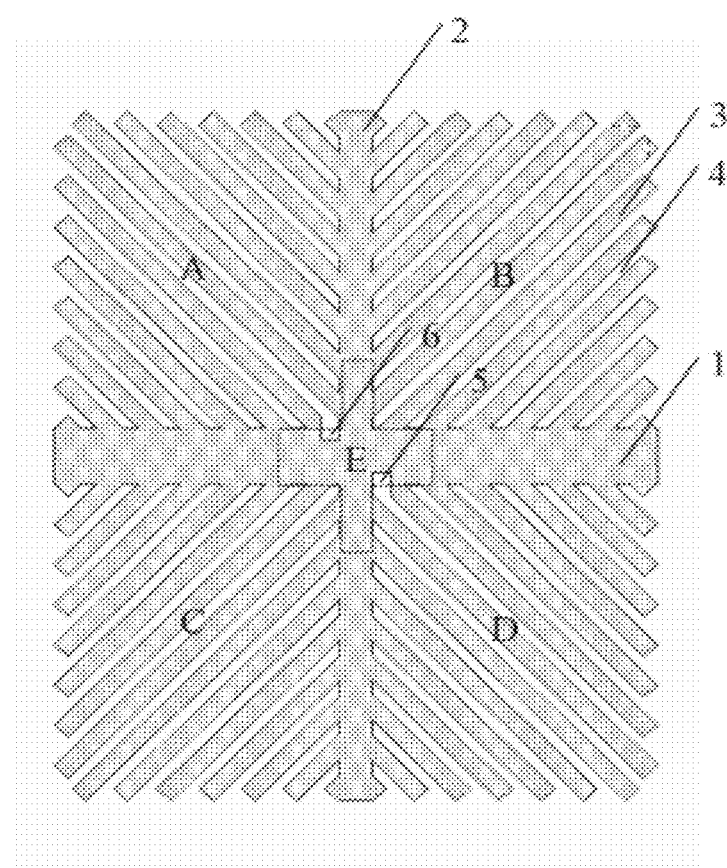
FIG. 7 is a schematic view illustrating a structure of pixel electrode according to a first embodiment of the present invention.

Referring to FIG. 7, which is a schematic view illustrating a structure of pixel electrode according to a first embodiment of the present invention.

Figure 8:
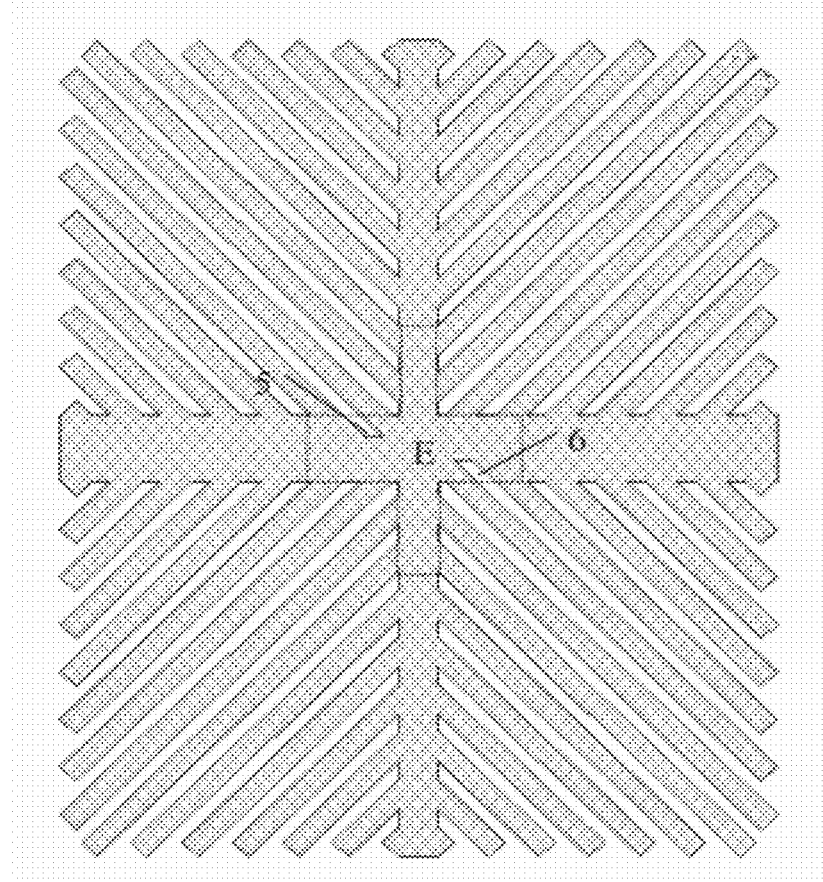
FIG. 8 is a schematic view illustrating a structure of pixel electrode according to a second embodiment of the present invention.

The structure of pixel electrode of the instant embodiment comprises:

a strip-like horizontal main trunk 1 and a strip-like vertical main trunk 2, the horizontal main trunk 1 and the vertical main trunk 2 centrally and perpendicularly intersecting each other;

a plurality of strip-like branches 3 arranged in each of four domains (the four domains A, B, C, and D shown in the drawings) that are formed by being equally divided by the central perpendicular intersection of the horizontal main trunk 1 and the vertical main trunk 2 at given angles with respect to the horizontal main trunk 1 and the vertical main trunk 2, wherein preferably, the plurality of strip-like branches 3 are at an angle of 45 degrees with respect to both the horizontal main trunk 1 and the vertical main trunk 2, and other angles are also feasible, for example, the strip-like branches 3 of domain B being set at an angle of 30 degrees with respect to the horizontal main trunk 1 and the strip-like branches 3 of domain A being at an angle of 150 degrees with respect to the horizontal main trunk 1, provided that the strip-like branches 3 of domain A and domain B, or domain C and domain D maintain symmetric, the plurality of strip-like branches 3 extending outward from a central point O of the perpendicular intersection of the vertical main trunk 2 and the horizontal main trunk 1 and the plurality of strip-like branches 3 being spaced by a plurality of slits 4;

two centrally symmetric openings being provided in a central zone at the central perpendicular intersection of the horizontal main trunk 1 and the vertical main trunk 2 (such as area E indicated by phantom lines of FIG. 8).

It is noted here that the instant embodiment provides two centrally symmetric openings in the horizontal main trunk 1 and the shape of openings is polygon or sector. In FIG. 7, the polygonal openings are shown to be a quadrilateral opening 5 and a quadrilateral opening 6 respectively.

Figure 1:
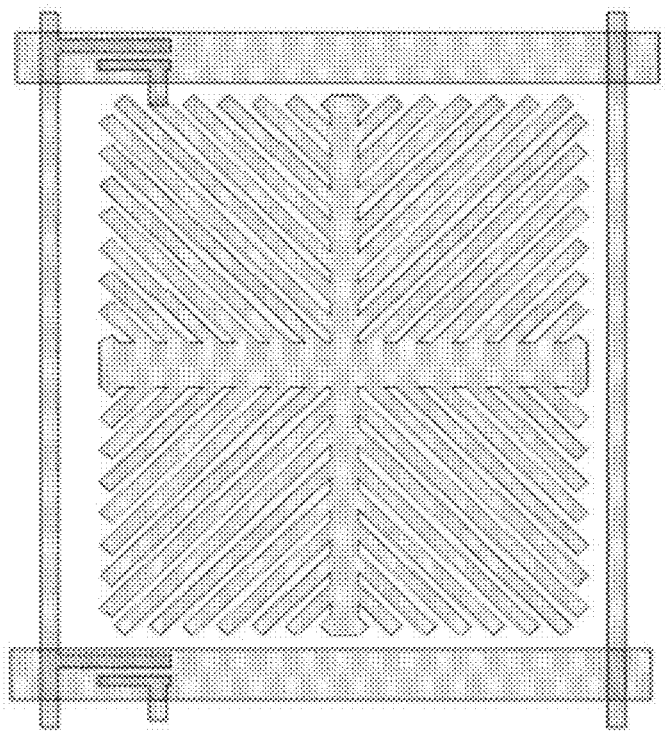
FIG. 1 is a schematic view showing a conventional design of pixel electrode that is commonly used in regular VA (Vertical Alignment) mode liquid crystal display devices.
Figure 2:
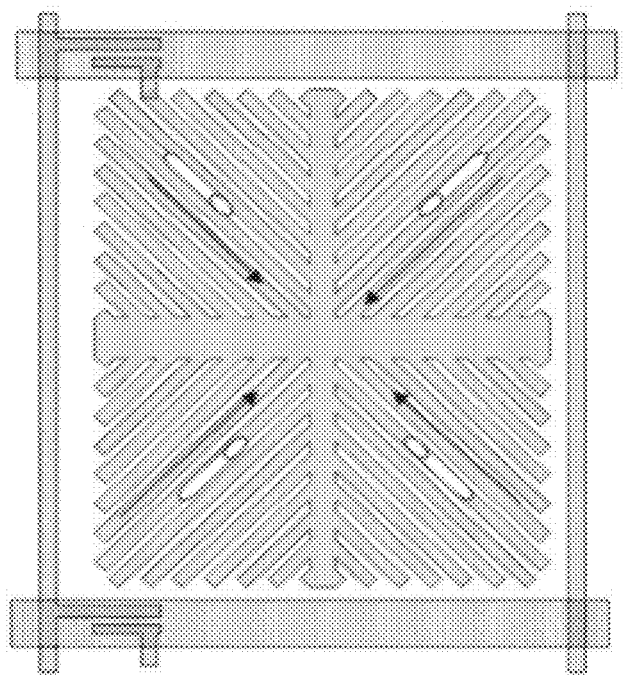
FIG. 2 is a schematic view illustrating inclination of liquid crystal with a voltage applied to the structure of pixel electrode shown in FIG. 1.
Figure 3:
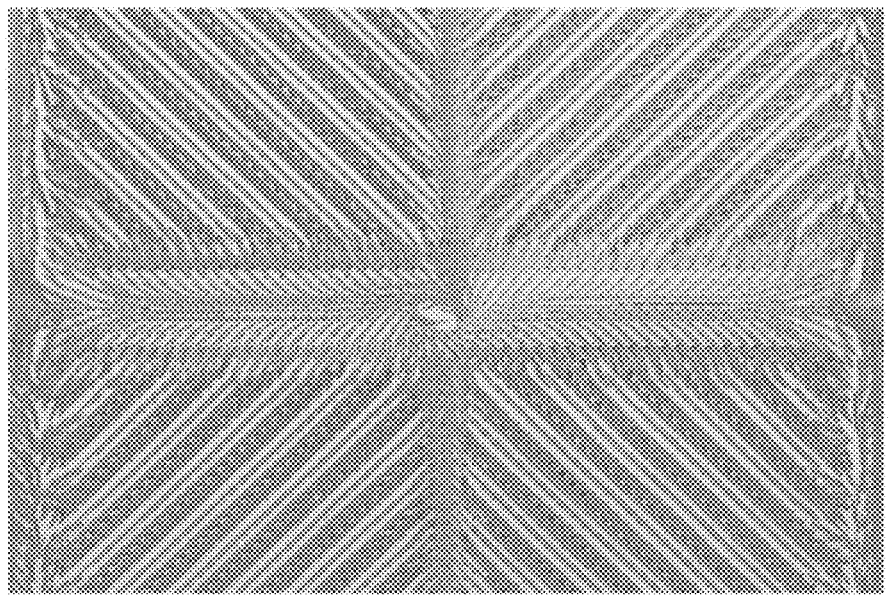
FIG. 3 is a schematic view illustrating inclination of liquid crystal in a structure of pixel electrode causes formation of a swirl at the center.
Figure 4:
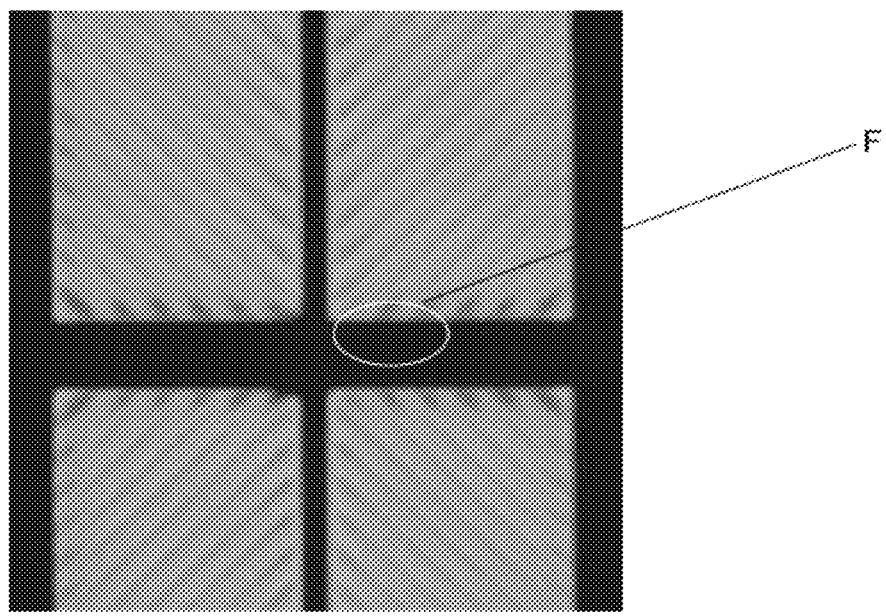
FIG. 4 is a schematic view of the structure of pixel electrode corresponding to FIG. 3 observed with a microscope.
Figure 5:
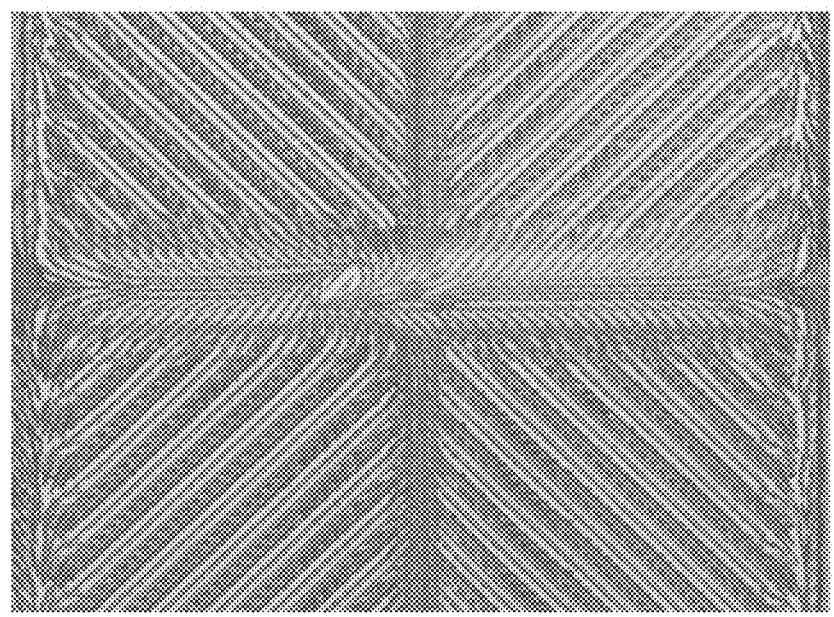
FIG. 5 is a schematic view illustrating a swirl caused by inclination of liquid crystal in a structure of pixel electrode is sideway shifted.
Figure 6:
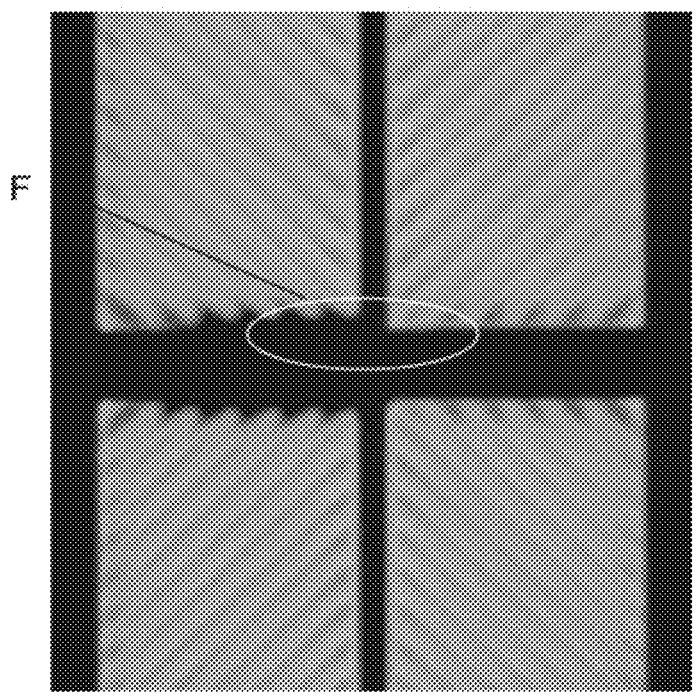
FIG. 6 is a schematic view of the structure of pixel electrode corresponding to FIG. 5 observed with a microscope.

Through application of the structure of pixel electrode shown in FIG. 7, a swirl like liquid crystal rotation region may be formed in the central zone E of the structure of pixel electrode of which simulation of orientation of liquid crystal is similar to what shown in FIG. 3. Thus, actual situation of liquid crystal displaying as observed with microscope is similar to what shown in FIG. 4, namely increased bright area, improved transmittance, and improved displaying performance.

It is noted that among the four domains A, B, C, and D formed by being equally divided by the central perpendicular intersection of the horizontal main trunk 1 and the vertical main trunk 2, domains A and B are of mirror symmetry; domains C and D are of mirror symmetry; domains A and C are of mirror symmetry; and domains B and D are of mirror symmetry.

FIG. 7 shows an embodiment in which centrally symmetric quadrilateral openings are formed in the central zone E, yet forming triangular openings or parallelogram or sector openings achieve the same technical effect, see FIG. 8.

FIG. 8 is a schematic view illustrating a structure of pixel electrode according to a second embodiment of the present invention.

The structure of pixel electrode of the instant embodiment comprises:

a strip-like horizontal main trunk and a strip-like vertical main trunk, the horizontal main trunk and the vertical main trunk centrally and perpendicularly intersecting each other;

a plurality of strip-like branches arranged in each of four domains that are formed by being equally divided by the central perpendicular intersection of the horizontal main trunk and the vertical main trunk at given angles with respect to the horizontal main trunk and the vertical main trunk, the plurality of strip-like branches extending outward from a central point of the perpendicular intersection of the vertical main trunk and the horizontal main trunk, the plurality of strip-like branches being spaced by a plurality of slits;

two centrally symmetric openings being provided in a central zone at the central perpendicular intersection of the horizontal main trunk and the vertical main trunk (such as area E indicated by phantom lines of FIG. 8).

It is noted here that the instant embodiment provides two centrally symmetric openings that are parallelogram in the horizontal main trunk, which are respectively a parallelogram opening 5 and a parallelogram opening 6.

The polygons that are provided herein include triangles, quadrilaterals, pentagons, sectors, and the likes, and such polygons and sectors are all considered within the protection scope of the invention provided they provide an effect of guiding liquid crystal to orient toward the central zone. Repeated description will be omitted.

It is noted here that the central zone E of the perpendicular intersection of the horizontal main trunk and the vertical main trunk has a length of $x \leq X/2$ in the horizontal direction, where capital X indicates the length of the horizontal main trunk, and the central zone E has a length of $y \leq Y/2$ in the vertical direction, where capital Y indicates the length of the vertical main trunk.

Guidance to the orientation of liquid crystal can be effectively provided as long as two centrally symmetric polygons are provided in the central zone E to have the liquid crystal forms a swirl like liquid crystal rotation region in the central zone. Certainly, the closer to the central perpendicular intersection of the horizontal main trunk and the vertical main trunk the centrally symmetric polygons are arranged, the closer to the central point the swirl like liquid crystal rotation region formed by the liquid crystal is.

In the above described embodiment, the polygonal openings provided in the central zone E are polygonal openings formed in the horizontal main trunk, and it is also feasible for the present invention to arrange two centrally symmetric polygonal openings in the vertical main trunk. The purpose and advantage desired by the present invention can also be achieved provided that the central symmetry is maintained, even the structure of pixel electrode is not left-right symmetric.

Figure 9:
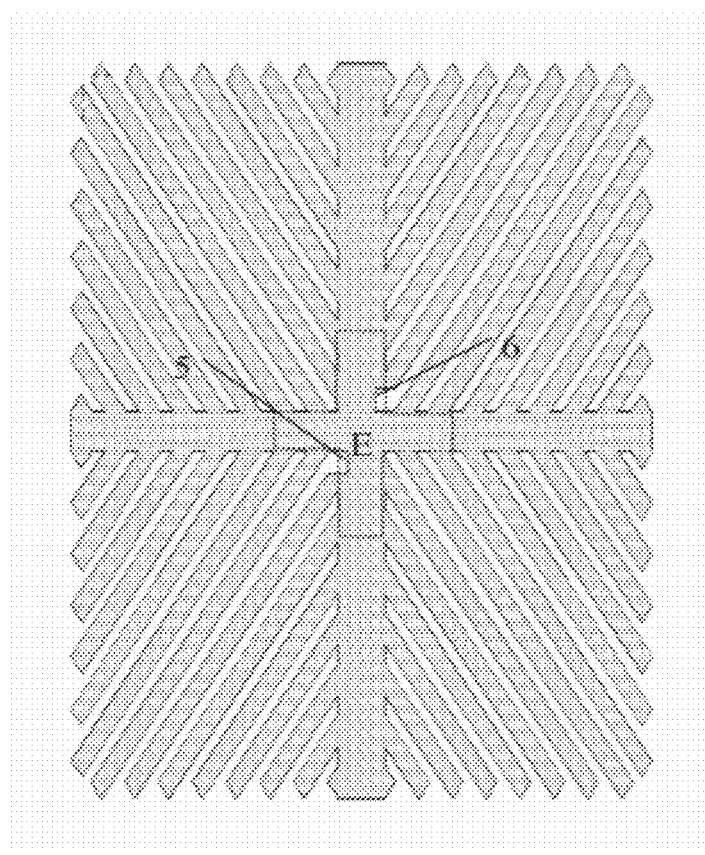
FIG. 9 is a schematic view illustrating a structure of pixel electrode according to a third embodiment of the present invention.

FIG. 9 is a schematic view illustrating a structure of pixel electrode according to a third embodiment of the present invention.

The structure of pixel electrode of the instant embodiment comprises:

a strip-like horizontal main trunk and a strip-like vertical main trunk, the horizontal main trunk and the vertical main trunk centrally and perpendicularly intersecting each other;

a plurality of strip-like branches arranged in each of four domains that are formed by being equally divided by the central perpendicular intersection of the horizontal main trunk and the vertical main trunk at given angles with respect to the horizontal main trunk and the vertical main trunk, the plurality of strip-like branches extending outward from a central point of the perpendicular intersection of the vertical main trunk and the horizontal main trunk, the plurality of strip-like branches being spaced by a plurality of slits. Two centrally symmetric openings are provided in a central zone at the central perpendicular intersection of the horizontal main trunk and the vertical main trunk (such as area E indicated by phantom lines of FIG. 9).

It is noted here that the instant embodiment provides two centrally symmetric openings, and specifically two centrally symmetric quadrilaterals 5 and 6 are formed in the vertical main trunk.

It is noted that the pixel electrode according to the present invention is applicable to polymer stabilization vertical alignment (PSVA) liquid crystal display panels or pattern vertical alignment (PVA) liquid crystal display panels and the lies. The material that makes the pixel electrode of the structure of pixel electrode is indium tin oxide, indium zinc oxide, or amorphous indium tin oxide.

The structure of pixel electrode of this application is of an elaborate design and specifically, two centrally symmetric openings, which has a shape of polygon or sector, are provided in a central zone at a central perpendicular intersection of a vertical main trunk and a horizontal main trunk in order to make a breakthrough in respect of the absolute symmetry arrangement of the existing designs of pixel electrode structure and to allow the overall structure of pixel electrode to show central symmetry but is not left-right symmetric. This is helpful in guiding liquid crystal to form a swirl like liquid crystal rotation region in the site within the central zone of the structure of pixel electrode where the polygonal or sector openings are formed. Since the openings are centrally symmetric, they can well maintain the location where the swirl like liquid crystal rotation region is formed, namely fixing the swirl at a central location, so as to prevent reduction of bright area and transmittance of a displaying zone when an image is displayed.

The description given above is a preferred embodiment of the present invention and it is noted that for those having ordinary skills of the art, numerous improvements and modifications can be made without departing the principles of the present invention. Such improvements and modifications are considered within the scope of protection of the present invention.

What is claimed is:

1. A structure of a pixel electrode, comprising:
    a strip-like horizontal main trunk and a strip-like vertical main trunk, the horizontal main trunk and the vertical main trunk centrally and perpendicularly intersecting each other;
    a plurality of strip-like branches arranged in each of four domains that are formed by being equally divided by the central perpendicular intersection of the horizontal main trunk and the vertical main trunk, the plurality of strip-like branches extending outward from a central point of the perpendicular intersection of the vertical main trunk and the horizontal main trunk, the plurality of strip-like branches being spaced by a plurality of slits; and
    two centrally symmetric openings provided in a central zone at the central perpendicular intersection of the horizontal main trunk and the vertical main trunk, wherein the two openings are not symmetrical about each of the horizontal main trunk and the vertical main trunk.

2. The structure of the pixel electrode as claimed in claim 1, wherein the two centrally symmetric openings have a shape of polygon or sector.

3. The structure of the pixel electrode as claimed in claim 2, wherein the central zone at the perpendicular intersection of the horizontal main trunk and the vertical main trunk has a length of $x \leq X/2$ in a horizontal direction, where X indicates a length of the horizontal main trunk, and the central zone at the perpendicular intersection of the horizontal main trunk and the vertical main trunk has a length of $y \leq Y/2$ in a vertical direction, where Y indicates a length of the vertical main trunk.

4. The structure of the pixel electrode as claimed in claim 2, wherein among the four domains formed by being equally divided by the central perpendicular intersection of the horizontal main trunk and the vertical main trunk, a left upper domain and a right upper domain are of mirror symmetry; a left lower domain and a right lower domain are of mirror symmetry; the left upper domain and the left lower domain are of mirror symmetry; and the right upper domain and the right lower domain are of mirror symmetry.

5. The structure of the pixel electrode as claimed in claim 4, wherein the structure of the pixel electrode has a snow flake like configuration, the plurality of strip-like branches being at an included angle of 45 degrees with respect to the vertical main trunk and the horizontal main trunk.

6. The structure of the pixel electrode as claimed in claim 5, wherein the plurality of strip-like branches is spaced by a plurality of slits of an identical width.

7. The structure of the pixel electrode as claimed in claim 5, wherein the plurality of strip-like branches is spaced by a plurality of slits of different widths.

8. The structure of the pixel electrode as claimed in claim 6, wherein the plurality of strip-like branches has an identical width.

9. The structure of the pixel electrode as claimed in claim 6, wherein the plurality of strip-like branches has different widths.

10. The structure of the pixel electrode as claimed in claim 6, wherein modes of a liquid crystal display panel to which the structure of the pixel electrode is applicable include a polymer stabilization vertical alignment mode and a pattern vertical alignment mode.

11. The structure of the pixel electrode as claimed in claim 7, wherein the plurality of strip-like branches has an identical width.

12. The structure of the pixel electrode as claimed in claim 7, wherein the plurality of strip-like branches has different widths.

13. The structure of the pixel electrode as claimed in claim 7, wherein modes of a liquid crystal display panel to which the structure of the pixel electrode is applicable include a polymer stabilization vertical alignment mode and a pattern vertical alignment mode.

* * * * *